United States Patent [19]

Haseda et al.

[11] Patent Number: 4,836,319

[45] Date of Patent: Jun. 6, 1989

[54] STEERING CONTROL APPARATUS FOR MOTOR VEHICLES

[75] Inventors: Satoshi Haseda, Oobu; Yoshihiko Tsuzuki, Toyota; Yoshimune Konishi, Okazaki; Motoshi Suzuki, Kariya, all of Japan

[73] Assignee: Nippondenso Co., Ltd., Kariya, Japan

[21] Appl. No.: 75,837

[22] Filed: Jul. 20, 1987

[30] Foreign Application Priority Data

Jul. 22, 1986 [JP] Japan ................................ 61-172448
Aug. 9, 1986 [JP] Japan ................................ 61-187158

[51] Int. Cl.$^4$ .............................................. B62D 5/04
[52] U.S. Cl. .................................... 180/142; 180/79.1; 280/91; 364/424.01
[58] Field of Search .................. 280/91; 180/140, 142, 180/79.1; 364/424, 424.01, 424.04, 424.05

[56] References Cited

U.S. PATENT DOCUMENTS

| 4,625,822 | 12/1986 | Nakamura et al. | 180/140 |
| 4,652,002 | 3/1987 | Kurokawa et al. | 180/79.1 |
| 4,666,013 | 5/1987 | Shihabata et al. | 280/91 X |
| 4,669,744 | 6/1987 | Sano et al. | 280/91 |

FOREIGN PATENT DOCUMENTS

| 59-92260 | 5/1984 | Japan . | |
| 60-183264 | 9/1985 | Japan | 280/91 |
| 60-189019 | 9/1985 | Japan . | |
| 61-64584 | 4/1986 | Japan | 280/91 |
| 61-193967 | 8/1986 | Japan | 180/140 |

OTHER PUBLICATIONS

"Variable Structure System with Sliding Modes" by Vadim I. Utkin; IEEE Transactions on Automatic Control, vol. AC-22, Apr. 1977, pp. 212-222.

Primary Examiner—Charles A. Marmor
Assistant Examiner—Eric Culbreth
Attorney, Agent, or Firm—Cushman, Darby & Cushman

[57] ABSTRACT

A steering apparatus for use in a motor vehicle whereby the actual steering angle of a vehicle wheel is controlled to be equal to a target steering angle. The steering apparatus includes a steering mechanism for regulating a steering angle of the vehicle wheel in accordance with an input signal thereto, a device for determining a target steering angle of the wheel in accordance with the vehicle travelling state, a device for obtaining the difference (X1) between the determined target steering angle and the actual steering angle of the wheel, and a device for calculating a steering angular velocity (X2) on the basis of the actual steering angle. A control device calculates at least two switching functions (L1), (L2) on the basis of the obtained difference (X1) and the calculated steering angular velocity (X2) for obtaining a switching line on the basis of the calculated switching functions (L1), (L2). A control signal is generated as the input signal to the steering mechanism so that the obtained difference (X1) and the calculated steering angular velocity (X2) are respectively converged to zero under restriction of the obtained switching line. Preferably, the two switching functions (L1), (L2) are corrected on the basis of the vehicle travelling state including the speed of the motor vehicle.

14 Claims, 14 Drawing Sheets

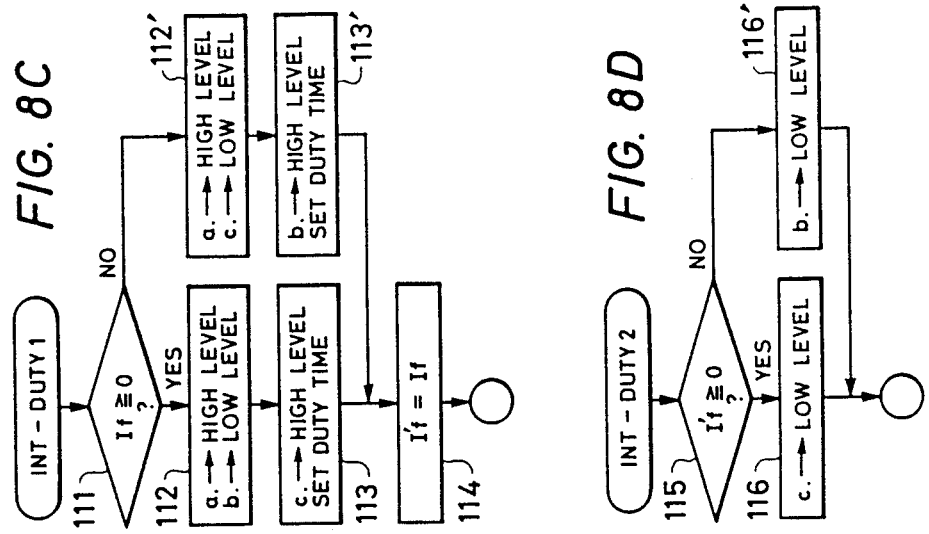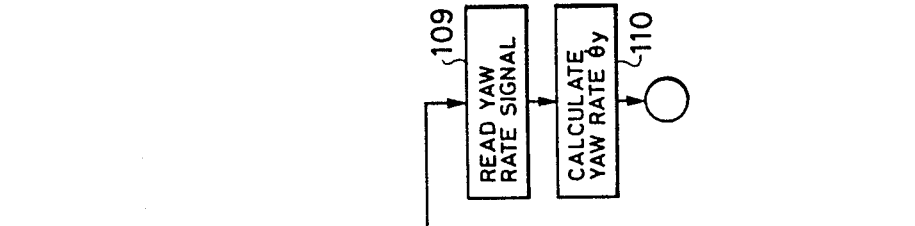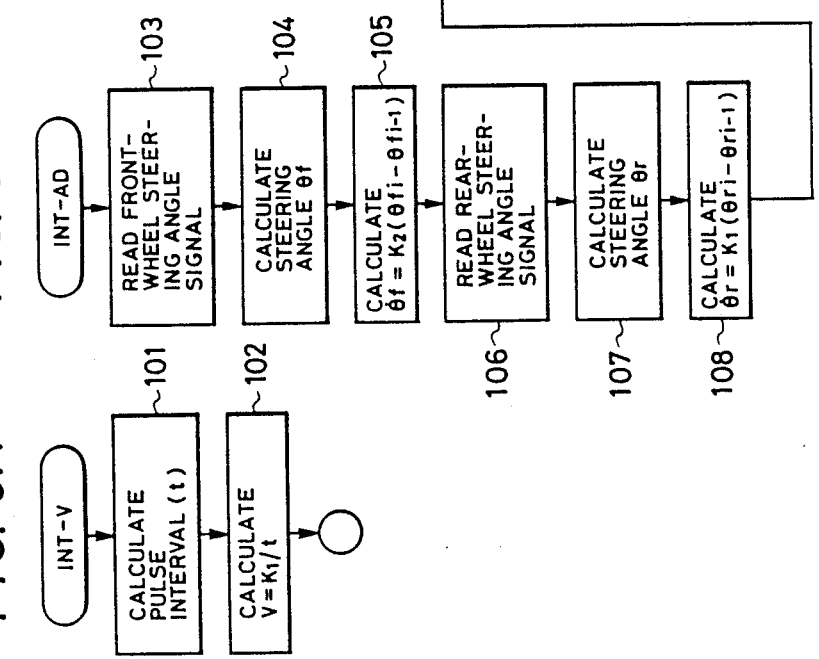

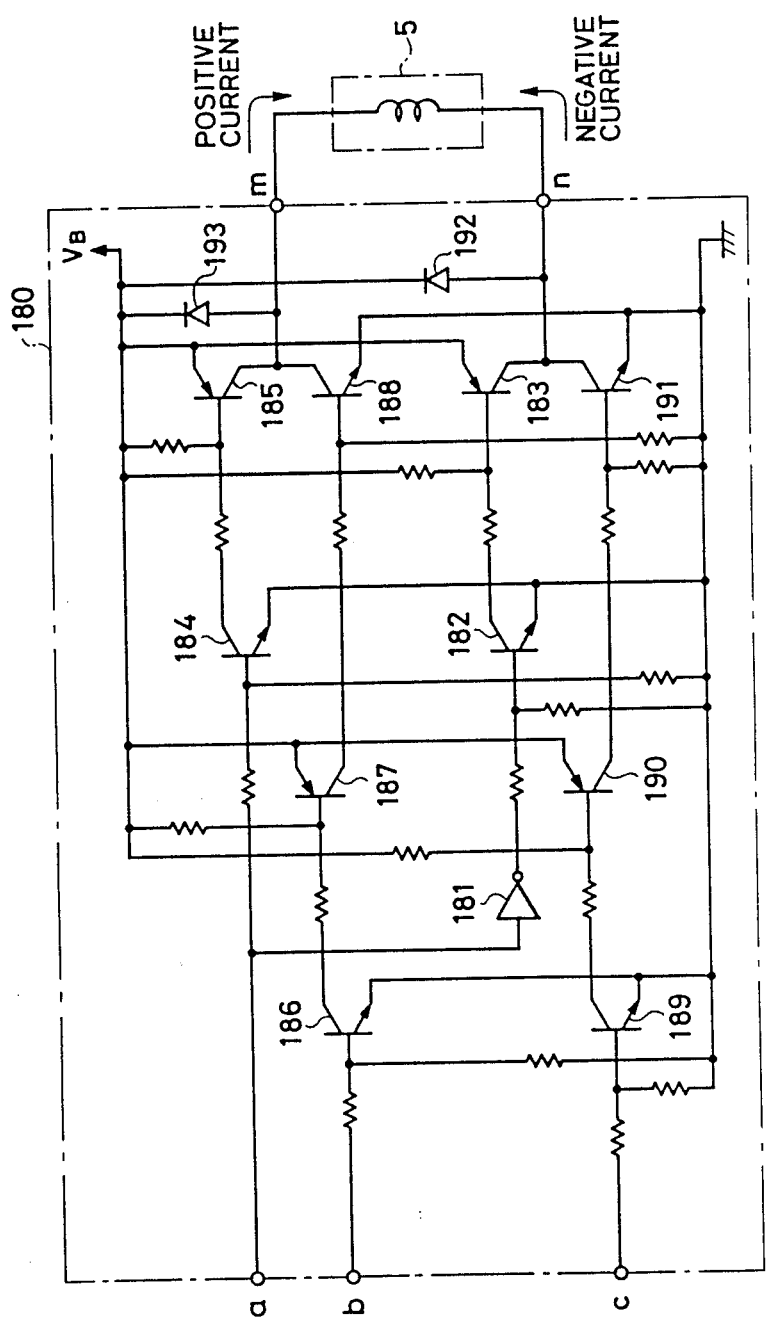

STEERING CONTROL APPARATUS FOR MOTOR VEHICLES

BACKGROUND OF THE INVENTION

The present invention relates generally to a steering apparatus for motor vehicles, and more particularly to a steering control apparatus for properly controlling the steering angle of the front or rear wheels in accordance with the travelling state of a motor vehicle.

Various types of steering apparatuses for motor vehicles have been developed heretofore, one known approach being to control a servo valve by a hydraulic pressure mechanism and another known approach being to use a dc servo motor or a stepping motor. These steering apparatuses are adapted to drive the servo valve or the servo motor by a current corresponding to the difference between the aarget steering angle and the actual steering angle under the so-called PID (Proportional Integral Differential) control or state feedback control. While the steering systems require increasing the amount of the current, i.e., control gain, in order to improve responsibility and control accuracy, the control gain increase results in overshoot with respect to the target steering angle and hunting, i.e., periodic variations, occurring in the vicinity of the target steering angle in response to variations in the power source voltage and fluctuations in load torque during the steering operation, thereby making unstable the driving characteristics of the motor vehicle. On the other hand, prevention of the overshoot and hunting leads to lowering the responsibility and control accuracy which in turn makes worse the driving characteristics.

In order to avoid such problems, it is known that the PID control steering system may have an arrangement for feedback control of various signals, the state feedback control system having an arrangement for successively changing the control gain in accordance with the real time system identification. However, provisions of these arrangements make complex the control circuits, resulting in complex steering systems.

SUMMARY OF THE INVENTION

It is therefore an object of the present invention to provide a new and improved steering apparatus which is capable of performing the vehicle steering with high responsibility and control accuracy without the occurrence of overshoot and hunting.

In accordance with the present invention, there is provided a steering apparatus for use in a motor vehicle basically comprising steering mechanism means for regulating a steering angle of a wheel of the motor vehicle in accordance with an input signal thereto, target steering angle setting means for determining a target steering angle of the wheel in accordance with the vehicle travelling state and for generating a signal indicative of the determined target steering angle, error calculating means for obtaining the difference (X1) between the determined target steering angle and the actual steering angle of the wheel, angular velocity calculating means for calculating a steering angular velocity (X2) on the basis of the actual steering angle, and control means for controlling the steering mechanism means so that the actual steering angle of the wheel becomes equal to the target steering angle.

A feature of the present invention is that the control means calculates at least two switching functions (L1), (L2) on the basis of the obtained difference (X1) and the calculated steering angular velocity (X2) for obtaining a switching line on the basis of the calculated switching functions (L1), (L2), the control means generating a control signal as the input signal tothe steering mechanism means so that the obtained difference (X1) and the calculated steering angular velocity (X2) are respectively converged to zero under restriction of the obtained switching line. Preferably, the steering apparatus includes correction means for correcting the two switching functions (L1), (L2) on the basis of the vehicle travelling state. For example, the correction means corrects the two switching functions (L1), (L2) in accordance with the speed of the motor vehicle. When the steering mechanism means regulates the steering angle of the rear wheel of the motor vehicle, the correction means corrects the switching functions (L1), (L2) on the basis of the vehicle speed and the front wheel steering angular velocity of the front wheel.

The control means can calculate the two switching functions (L1) and (L2) on the basis of the difference (X1) and the steering angular velocity (X2) in accordance with equations:

$$L1 = C \cdot X1 - X2$$

$$L2 = L1 \cdot X1$$

where C is a coefficient and, the correction means corrects the switching functions (L1), (L2) by changing the value of the coefficient C.

The control means determines the control signal in accordance with the steps of calculating a basic term (Ib) on the basis of the difference (X1) and the switching function (L2) in accordance with equations:

$$Ib = Ga \cdot X1 \text{ when } L2 \geq 0$$

$$Ib = Gb \cdot X1 \text{ when } L2 < 0$$

where Ga and Gb are constants; calculating a correction term (Im) on the basis of the switching function (L1) in accordance with equations:

$$Im = M \text{ when } L1 \geq 0$$

$$Im = -M \text{ when } L1 < 0$$

where M is a constant which is equal to or greater than zero; calculating a control value (If) on the basis of the calculated basic term (Ib) and correction term (Im) in accordance with an equation:

If = Ib + Im; and determining the control signal corresponding to the calculated control value (If).

In accordance with the present invention, there is further provided a steering apparatus for use in a motor vehicle basically comprising steering mechanism means for regulating a steering angle of a wheel of the motor vehicle in accordance with an input signal thereto, target steering angle setting means for determining a target steering angle of the wheel on the basis of the vehicle travelling state, error calculating means for obtaining the difference (X1) between the determined target steering angle and the actual steering angle, angular velocity calculating means for calculating a steering angular velocity (X2) on the basis of the actual steering angle, decision means for checking whether the steering mechanism means is in the state that the steering operation is terminated and for generating a signal indicative of the steering termination when the steering operation is terminated; and control means for controlling the steering mechanism so that the steering angle of the wheel is equal to the target steering angle.

A feature of this embodiment of the invnetion is that the control means calculates at least two switching functions (L1), (L2) on the basis of the obtained difference (X1) and the calculated steering angular velocity (X2) for obtaining a switching line on the basis of the calculated switching functions (L1), (L2), the control means generating a control signal as the input signal to the steering mechanism means so that the obtained difference and the calculated steering angular velocity are respectively converged to zero under restriction of the obtained switching line, the control signal being corrected in response to the generation of the steering termination signal from the decision means.

The control means can similarly calculate the two switching functions (L1) and (L2) on the basis of the difference (X1) and the steering angular velocity (X2) in accordance with the above-mentioned processes. The decision means decides the steering termination state under the conditions of $-e \leq X1 \leq e$ and $-v \leq X2 < v$ where e and v are constants which are respectively greater than zero. In response to the generation of the steering termination signal from the decision means, M is varied to a predetermined value Mb, M being set to a predetermined value Ma when the steering mechanism means is in operation. Preferably, M is gradually decreased to the predetermined value Mb by subtracting a given value from Ma at every predetermined time period in response to the generation of the steering termination signal where $Ma > Mb \geq 0$.

BRIEF DESCRIPTION OF THE DRAWINGS

The object and features of the present invention will become more readily apparent from the following detailed description of the preferred embodiments taken in conjunction with the accompanying drawings in which:

FIGS. 8A to 8D and 9 are flow charts showing the program provided for the first embodiment;

FIG. 11 is a diagram showing the detailed arrangement of the drive circuit for driving the steering mechanism;

DETAILED DESCRIPTION OF THE INVENTION

Prior to making a detailed description of a steering apparatus for use in a motor vehicle according to a first embodiment of the present invention, a brief description of the basic arrangement of the steering apparatus of this embodiment will be made with reference to FIG. 1 for a better understanding.

Figure 1:
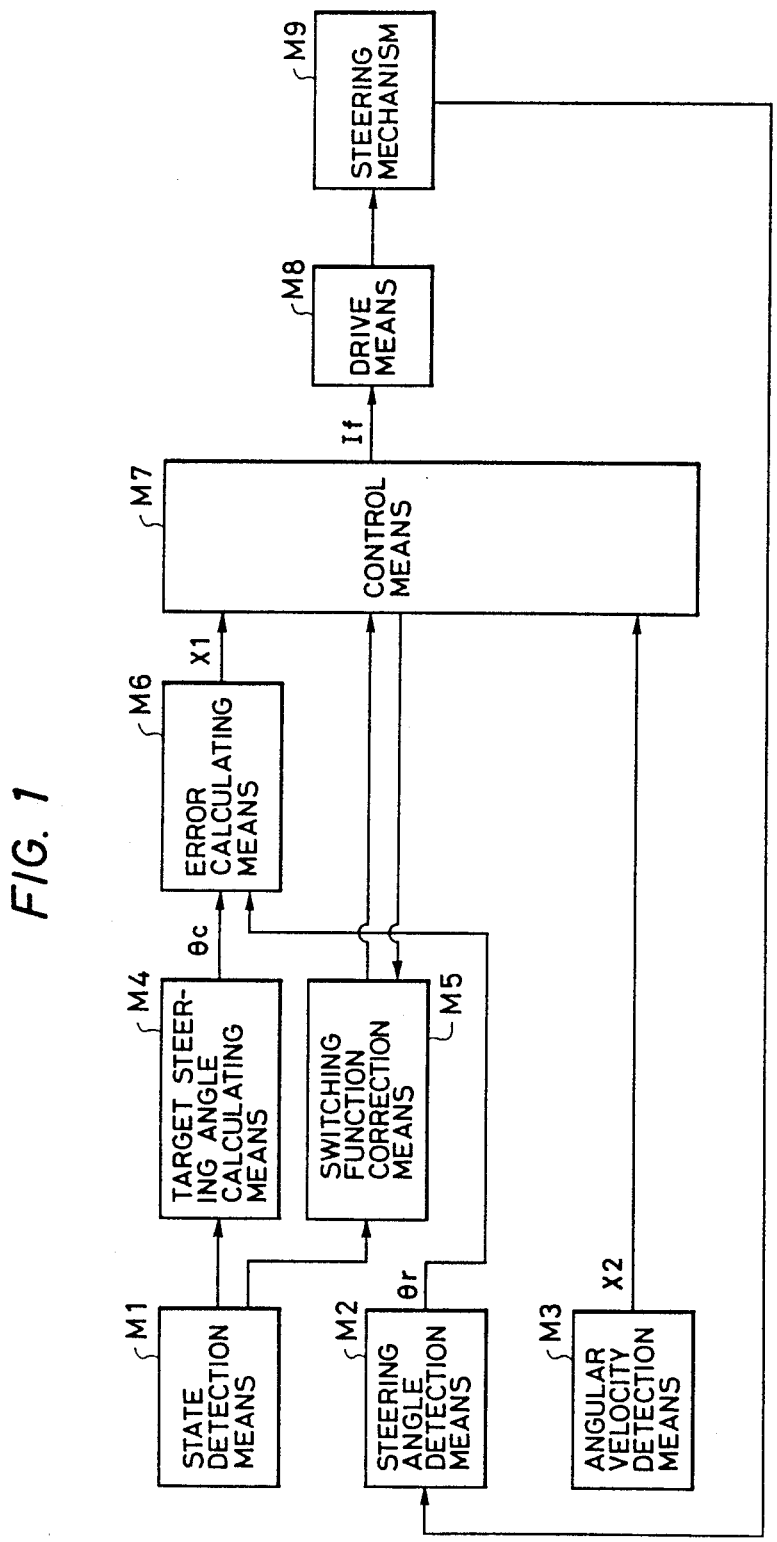
FIG. 1 is a block diagram showing the basic arrangement of a steering apparatus according to a first embodiment of the present invention.

In FIG. 1, a target steering angle calculating means M4 is responsive to the output signal of a vehicle state detection means M1 for detecting the travelling state of a motor vehicle so as to calculate a target steering angle of the motor vehicle. The output signal ($\theta$c) of the target steering angle calculating means M4 indicative of the calculated target steering angle is compared in an error calculating means M6 with an actual steering angle signal, ($\theta$r) generated from a steering angle detection means M2 so as to calculate the difference between the calculated target steering angle and the detected actual steering angle. The error calculating means M6 generates an error signal (X1) indicative of the calculated difference which is in turn supplied to a control mean M7 which is also connected to a steering angular velocity detecting means M3 for receiving a steering angular velocity signal (X2) generated therefrom. In the control means M7, a switching function is obtained on the basis of the difference and the detected steering angular velocity, and a switching line is formed in accordance wih the obtained switching function. The control means M7 generates a control signal (If) through drive means M8 to a steering mechanism M9 so that the difference and the steering angular velocity are converged to zero under the restriction imposed by the switching line. Preferably, a switching function correction means M5 is further provided therein so that the obtained swilrching function is corrected in accordance with the travelling state of the motor vehicle which has been detected by the vehicle state detection means M1.

Figure 2:
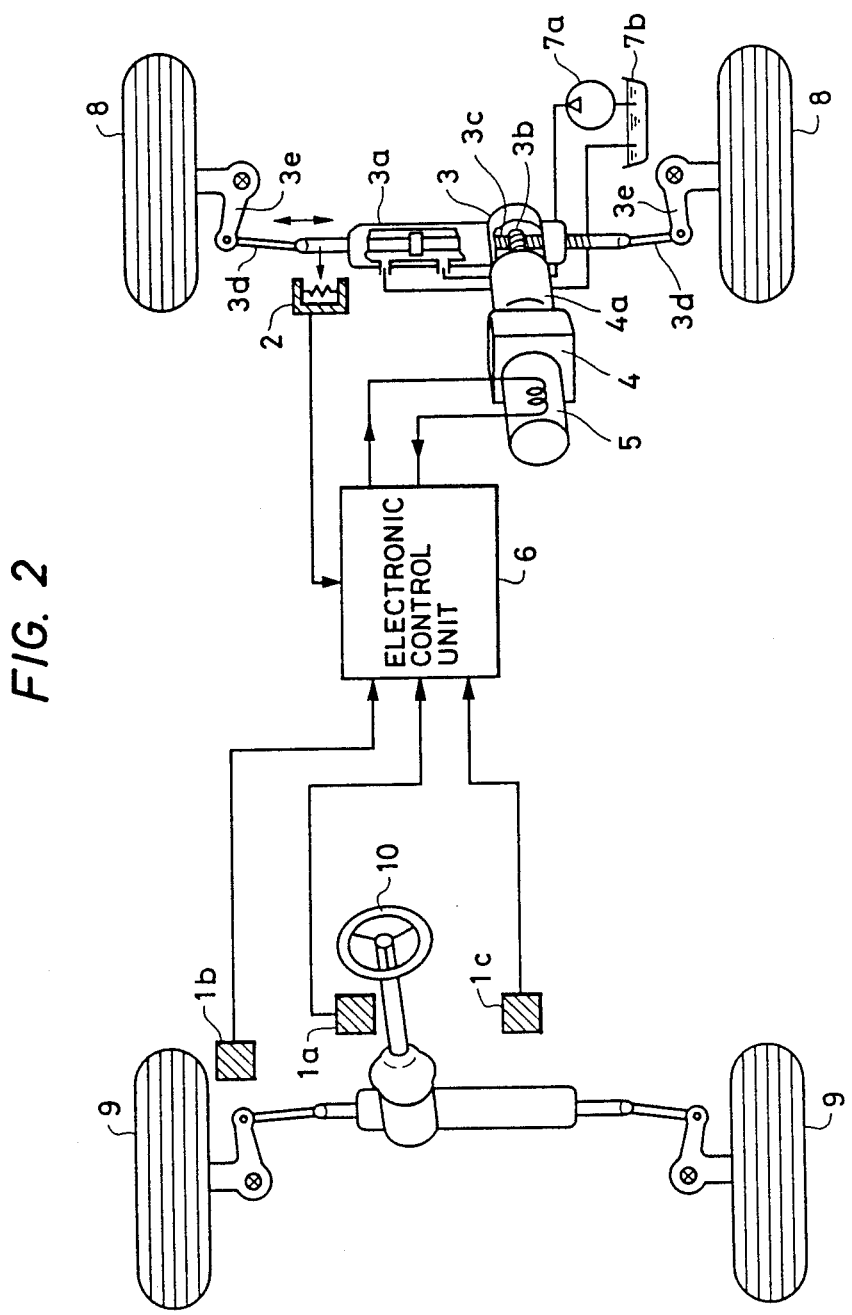
FIG. 2 is a schematic diagram showing an steering apparatus according to the present invention which is incorporated into a motor vehicle.

Referring now to FIG. 2, there is illustrated the steering apparatus according to the first embodiment of the present invention which is incorporated into a motor vehicle, the four wheels of which are steered. In FIG. 2, a dc servo motor 5, i.e., servo mechanism, is adapted to be rotated in the forward or reverse direction in response to an electric command signal from an electronic control unit 6 and is coupled through a reduction gear 4 to one end of an input shaft (torsion bar, not shown) of a rack and pinion mechanism 3, i.e., steering mechanism. To the other end of the torsion bar is attached a pinion gear 3b which is in turn engaged with a rack 3c formed at one end of a power piston 3a. In response to rotation of the one end of the torsion bar by the servo motor 5, the torsion bar is twisted to change the restriction area of a hydraulic valve 4a so that a hydraulic pressure is applied to the power piston 3a to reform the twist of the torsion bar. Each of the ends of the power piston 3a is connected through a tie rod 3d to a knuckle arm 3e associated with each of the rear wheels 8 of the motor vehicle. The rear wheels 8 are supported by the knuckle arms 3e to be swingable in the right and left directions. That is, the rear wheels 8 are steered in the right and left directions with the power piston 3a being moved in the directions of the arrows in FIG. 2. When the torsion bar is released from the twist, the restriction area of the hydraulic valve 4a becomes zero and hence the hydraulic pressure applied to the power piston 3a becomes zero. The reference 7a represents a hydraulic pump for applying a hydraulic pressure through the hydraulic valve 4a to the power piston 3a and the reference 7b designates an oil tank.

The steering angle of the rear wheels 8 can be determined by the position of the power piston 3a which is detected by a rear wheel steering angle sensor 2. The steering angular velocity can be derived as a function of the rate of change of the power piston 3a position.

Illustrated at 1a to 1c are sensors for detection of the travelling state of the motor vehicle, the sensor 1a generating a front wheel steering angle signal indicative of the steering angle of the front wheels 9 by detection of rotation of a steering wheel 10, the sensor 1b generating a vehicle speed signal representative of the speed of the motor vehicle by detection of the rotational speed of a wheel or a wheel shaft, and sensor 1c comprising a gyro and generating a yaw rate signal corresponding to the angular velocity of rotation of the motor vehicle about the center of gravity thereof.

Figure 3:
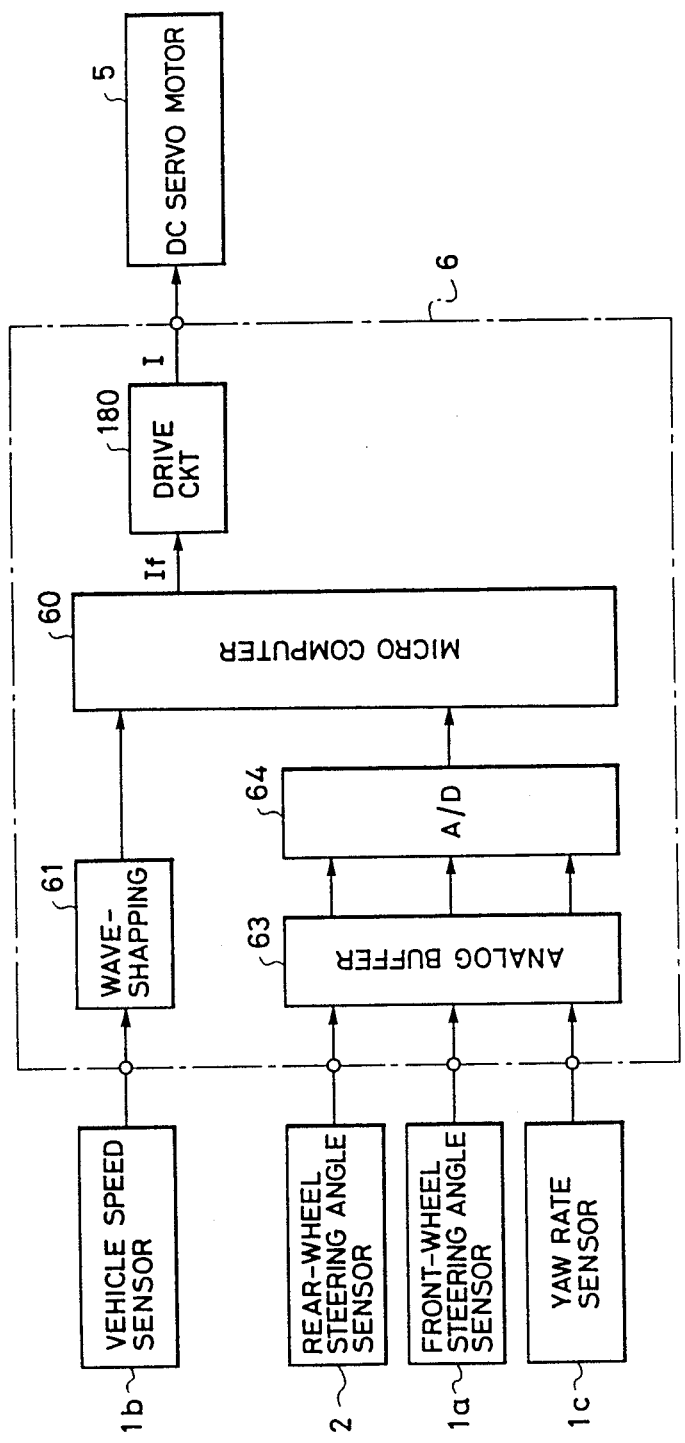
FIG. 3 is a block diagram showing an electronic control unit used for the present invention.

FIG. 3 is a block diagram for a description of the electronic control unit 6. The control unit 6 includes a waveform shaping circuit 61 for performing the waveform shaping of a vehicle speed signal from the vehicle speed sensor 1b and for supplying the waveform-shaped signal to a microcomputer 60, an analog buffer 63 coupled to signals from the rear wheel steering angle sensor 2, front wheel steering angle sensor 1a and yaw rate sensor 1c, an analog-to-digital converter 64 for A/D conversion of signals from the analog buffer 63, and a drive circuit 180 for driving the dc servo motor 5 in accordance with a command signal from the microcomputer 60.

Operations executed by the microcomputer 60 will hereinbelow be made with reference to the functional block diagram of FIG. 4.

The microcomputer 60 basically comprises means 610 for computing the target steering angle $\theta c$ of the rear wheels 8 in accordance with state signals $\theta f$, V, $\theta y$ from the front wheel steering angle sensor 1a, vehicle speed sensor 1b and yaw rate sensor 1c, means 611 for calculating the actual rear wheel steering angle $\theta r$ in response to a signal from the rear wheel steering angle sensor 2, means 612 for computing the steering angular velocity X2 on the basis of the rate of change of the signal from the rear wheel steering angle sensor 2, i.e., the differentiated value of the signal with respect to time, means 613 for calculating the difference X1 between the target steering angle $\theta c$ and the actual steering angle $\theta r$, and means 618 for computing and correcting the coefficient C of switching functions (which will be described hereinafter) on the basis of the vehicle speed signal V and so on. Also included in the microcomputer 60 is control means 650 for obtaining the switching functions L1, L2 which satisfy the conditions that the difference X1 and the steering angular velocity X2 are respectively converged to zero and for outputting a command signal If to the drive circuit 180 so that the difference X1 and the steering angular velocity X2 are respectively converged to zero while being constrained by a switching line Z obtained on the basis of the switching functions L1 and L2.

Figure 5:
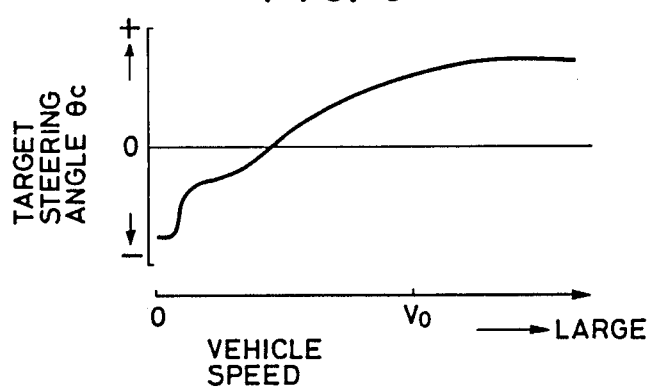
FIG. 5 is a graphic diagram illustrating the relationship between the target steering angle and the vehicle speed.

A further detailed description will be made hereinbelow. In the target steering angle computing means 610, the target steering angle $\theta c$ is first calculated on the basis of the vehicle speed V and the front wheel steering angle $\theta f$ so that the ratio of the rear wheel target steering angle $\theta c$ to the front wheel steering angle $\theta f$ (target steering ratio: $\theta c/\theta f$) assumes a predetermined value and, when the vehicle speed is over a predetermined value Vo, it is corrected so that a desired yaw rate gain (the ratio of the yaw rate value $\theta y$ to the front wheel steering angle $\theta f$) can be derived from the yaw rate value $\theta y$ from the yaw rate sensor 1c. FIG. 5 illustrates the relation between the target steering angle and the vehicle speed under the condition that the front wheel steering angle $\theta f$ and the yaw rate $\theta y$ assume certain values, respectively. In the illustration, when the target steering angle $\theta c$ is positive, the front and rear wheels are steered in the same direction, that is, the front and rear wheels are in phase with each other. When the target steering angle $\theta c$ is negative, the front and rear wheels are steered in the reverse directions from each other, that is, the front and rear wheels are out of phase. The actual steering angle calculating means 611 calculates the actual steering angle $\theta r$ on the basis of the position of the power piston 3a in accordance with a data map wherein the relation between the positions of the power piston 3a and the rear wheel steering angles is predetermined or in accordance with an equation.

Figure 6A:
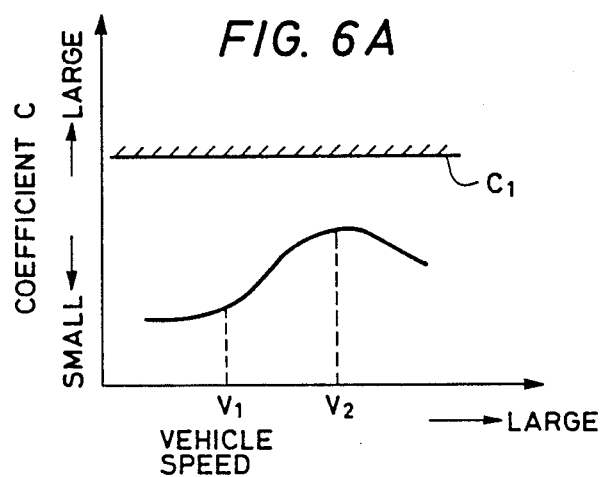
FIG. 6A is a graphic diagram illustrating the relationship between the coefficient for the steering control and the vehicle speed.
Figure 6B:
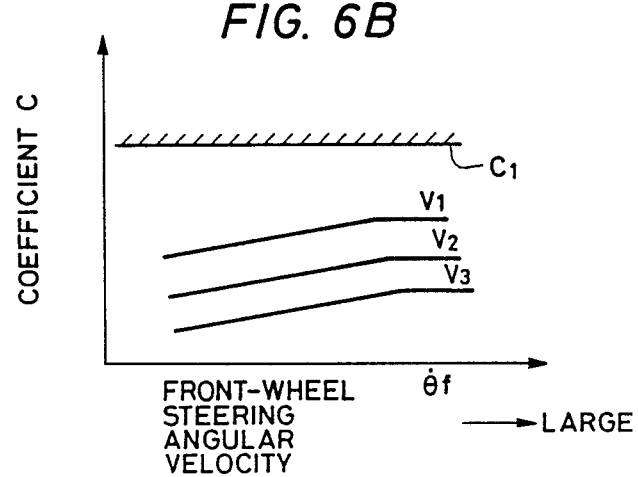
FIG. 6B is a graphic diagram showing the relation among the coefficient, vehicle speed and front wheel steering angular velocity.

The switching function correcting means 618 obtains the coefficient C (positive constant) on the basis of the vehicle speed V as shown in FIG. 6A, the relationship between the vehicle speed V and the coefficient C being in advance determined in view of a desired vehicle travelling characteristic. It will be understood from FIG. 6A that the coefficient C substantially assumes a constant value until the vehicle speed reaches V1, i.e., in a low speed region, and with the increase of the vehicle speed the value becomes greater when the vehicle speed is in the middle speed region between V1 and V2 and is decreased when the vehicle speed exceeds V2, i e., in the high speed region. The coefficient C is determined to be below a predetermined upper limit C1 for the purpose of stable control of the rear wheel steering. It is also appropriate that the coefficient C can be freely set in accordance with other methods to allow desired driving characteristics of the motor vehicle. For example, the coefficient C can be obtained in accordance with a two-dimensional map made on the basis of the vehicle speed V and the front wheel steering angular velocity $\dot{\theta}f$ as shown in FIG. 6B. The front wheel steering angular velocity $\dot{\theta}f$ is calculated in a front wheel steering angular velocity calculating means 619 on the basis of the signal from the front wheel steering angle sensor 1a.

The control means 650 comprises gain switching function calculation means 614, basic term calculation means 615, correction term calculation means 616, and final command value calculation means 617. The gain switching function calculation means 614 calculates gain switching functions L1 and L2 on the basis of the difference X1 between the target steering angle $\theta c$ and the actual steering angle $\theta r$, the steering angular velocity X2 and the coefficient C in accordance with the following equations (1) and (2).

$$L1 = C \cdot X1 - X2 \quad (1)$$

$$L2 = L1 \cdot X1 \quad (2)$$

where C is the coefficient calculated by the switching function correcting means 618 as described above.

The basic term calculation means 615 calculates a basic term Ib in accordance with the following equation (3) when the gain switching function L2 is positive and in accordance with the following equation (4) when the gain switching function L2 is negative.

$$\text{when } L2 \geq 0, \ Ib = Ga \cdot X1 \quad (3)$$

$$\text{when } L2 < 0, \ Ib = Gb \cdot X1 \quad (4)$$

where Ga and Gb are constants which are used for keeping the stability of the rear wheels.

The correction term calculation means 616 calculates a correction term Im in accordance with the following equation (5) when the gain switching function L1 is positive and in accordance with the following equation (6) when the gain switching function L1 is negative.

$$\text{when } L1 \geq 0, \ Im = M \quad (5)$$

$$\text{when } L1 < 0, \ Im = -M \quad (6)$$

where M is a constant ($M \geq 0$) for controlling the disturbance applied to the rear wheels, M being set to a value greater than the disturbance value estimated to be applied to the rear wheel steering control system including the rear wheel steering mechanism and the servo mechanism. The estimated disturbance value corresponds to the value of current to be inputted to the servo motor 5 for the disturbance control, with the disturbance being converted into the rotation of the motor shaft of the servo motor 5.

The final command value calculation means 617 calculates a final command value If on the basis of the calculated basic term Ib and correction term Im in accordance with the following equation (7).

$$If = Ib + Im \quad (7)$$

The command value If is outputted to the drive circuit 180 as a current command value, i.e., a duty ratio.

Figure 7A:
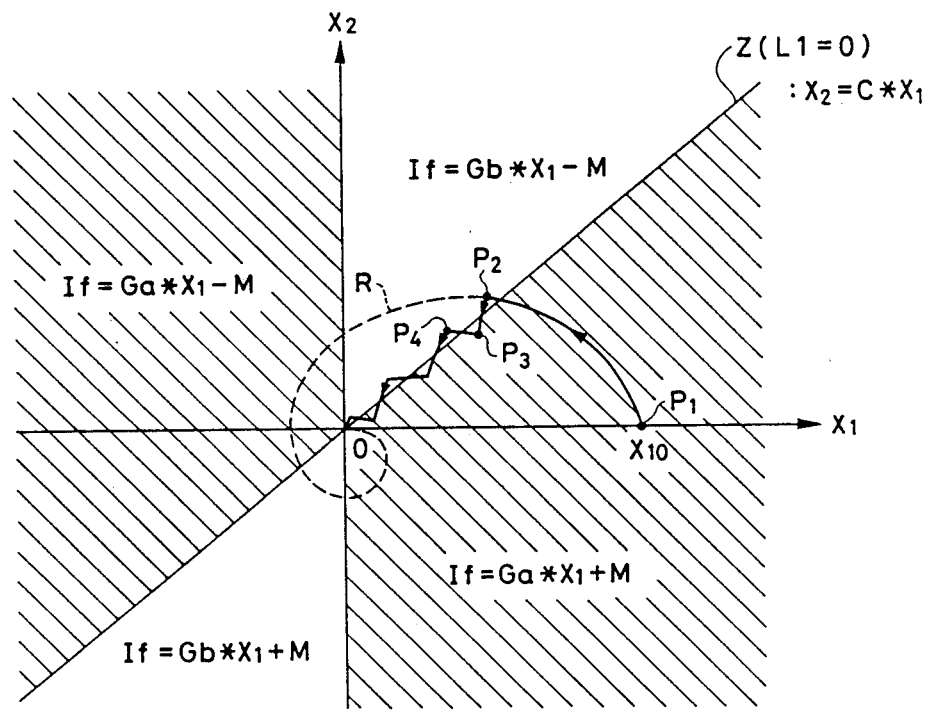
FIG. 7A is an illustration useful for describing the first embodiment.

The entire operations executed in the control means 650 will be described with reference to FIG. 7A which shows a phase surface orbit. In FIG. 7A, the X-axis represents the difference X1 between the target steering angle and the actual steering angle and the Y-axis represents steering angular velocity X2. The origin 0 represents the target steering angle $\theta c$, i.e., the state that the difference X1 is zero and the steering angular velocity X2 is also zero, and a solid line Z represents a switching line which can be obtained under the condition that the gain switching function L1=0. Portions in which oblique lines are drawn represents the regions of $L2 = L1 \cdot X1 \geq 0$. When the vehicle steering state determined on the basis of the difference X1 and the steering angular velocity X2 is in the oblique line region, the basic term calculation means 615 calculates the basic term Ib as Ib=Ga·X1. Otherwise, the basic term calculation means 615 calculates the basic term Ib as Ib=Gb·X1. Furthermore, when the state is in the regions of $L1 = C \cdot X1 - X2 \geq 0$, that is, when it is in the regions below the switching line Z, the correction term calculation means 616 sets the correction term Im to M, i.e., Im=M. On the other hand, when the state is in the regions above the switching line Z, the correction term calculation means 616 sets it to $-M$, i.e., Im=$-M$.

Here, for example, when the difference X1 between the actual steering angle $\theta r$ and the target steering angle $\theta c$ assumes X10, i.e., point P1 (X10, 0), in response to variations of the command value and the target steering angle $\theta c$, the drive circuit 180 supplies a positive current to the servo motor 5 in accordance with the final command value If (=Ga·X1+M) (If>0), thereby controlling the steering mechanism. In response to the supply of the positive current, the difference X1 is decreased with the steering angular velocity X2 of the rear wheels being rapidly increased (accelerated) from zero. Thereafter, when the state reaches a point P2 where the steering angular velocity X2 exceeds the switching line Z, the basic term Ib is given as Ib=Gb·X1 and the correction term Im is given as Im=$-M$, so as to supply a reverse current (If<0) corresponding to a new command value If (=Gb·X1$-M$) whereby the state is directed to a point P3. When the state has reached the point P3 after going across the switching line Z, a positive current obtained on the basis of If =Ga·X1+M is again supplied to the servo motor 5 so that the state reaches a point P4. Thus, the state is controlled to be converged to the origin (0, 0), i.e., the target steering angle $\theta c$, without overshoot by being restricted by the switching line Z. Even if the state is slipped out of the point P1 or P2 due to parameter variations, the state is converged to the target steering angle $\theta c$ without overshoot by being restricted by the switching line Z. In FIG. 7A, for example, the dotted line R represent the state in which overshoot has occurred. If the above-mentioned control is not performed at the point P2, the difference X1 successively becomes zero, negative, zero and positive and is then converged to the origin 0. That is, the overshoot occurs by exceeding the target steering angle $\theta c$ and then occurs in the opposite direction.

Figure 7B:
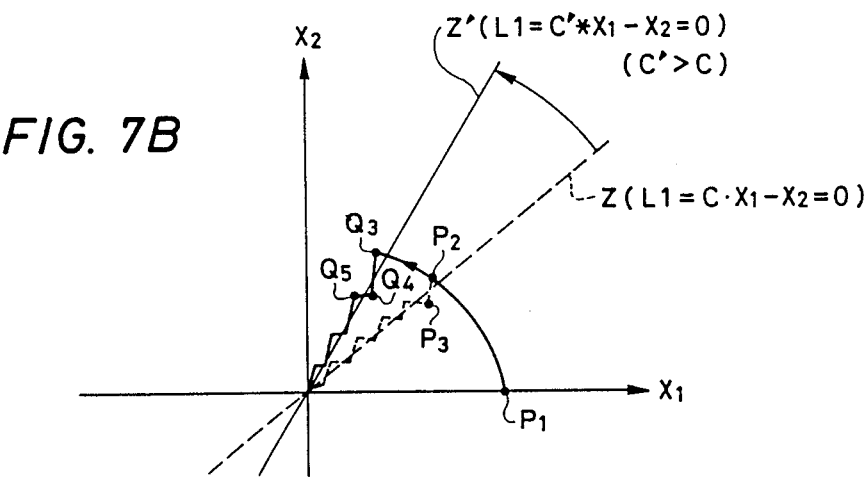
FIG. 7B is an illustration useful for describing the switching line and coefficient.

The correction of the coefficient C of the gain switching function L1 in the switching function correcting means 618 will be described with reference to FIG. 7B.

When the coefficient C is corrected to a coefficient C' greater than C (C'>C>0), the switching line Z is changed to a switching line Z' with a greater gradient. In this case, the state reaches a point Q3 after exceeding the point P2 from the point P1 because the state is restricted by the switching line Z' and is then converged to the origin 0 through points Q4, Q5 with the state being restricted by the switching line Z'. That is, since the steering angular velocity X2 at the point Q3 is higher as compared with the point P2 and the difference X1 thereat is smaller as compared therewith, the control time taken from the point P1 to the origin (target steering angle) becomes shorter, resulting in improvement of responsibility. Thus, the correction of the coefficient C effected in accordance with the travelling or driving state of the motor vehicle allows the response speed to properly correspond to the vehicle state.

The operations in the microcomputer 60 will be further described with reference to FIGS. 8A through 8D and 9 for more clear understanding.

FIG. 8A is a flow chart illustrating an interruption routine (int—V) for calculating the speed V of the motor vehicle, the execution of which is interruptible in response to pulses supplied from the vehicle speed sensor $1b$ which may comprise an electro-magnetic pick-up device arranged to generate pulses of a frequency corresponding to the rotational speed of the vehicle wheel or the wheel shaft. This interruption routine starts with a step 101 to measure a time interval t between the pulses from the vehicle speed sensor $1b$. In a subsequent step 102, the microcomputer 60 calculates the vehicle speed V in accordance with an equation V=K1/t where K1 is a constant and is determined on the basis of the rotational speed of the vehicle wheel or the wheel shaft.

FIG. 8B is a flow chart illustrating a first regular interval interruption routine (int—AD), the execution of which is interruptible at regular intervals, for example, every 5 ms. This routine begines with a step 103 to receive a signal supplied from the front wheel steering angle sensor $1a$ through the A/D converter 64. In the following step 104, a front wheel steering angle $\theta f$ is derived from the received signal. The step 104 is followed by a step 105 in which a front wheel steering angular velocity $\dot{\theta} f$ is computed in accordance with an equation $\dot{\theta} f = K2(\theta f_i - \theta f_{i-1})$ where K2 is a constant, $\theta f_i$ represents the present front wheel steering angle and $\theta f_{i-1}$ represents the front wheel steering angle calculated in the previous step. Control goes to a step 106 to receive the digitized signal of a signal supplied from the rear wheel steering angle sensor 2. The step 106 is followed by a step 107 to calculate a rear wheel steering angle $\theta r$ on the basis of the digitized signal received in the step 106. Control proceeds to a step 108 where a rear wheel steering angular velocity $\dot{\theta} r$ is calculated in accordance with an equation $\dot{\theta} r = K3(\theta r_i - \theta r_{i-1})$ where K3 is a constant, $\theta r_i$ represents the present rear wheel steering angle and $\theta r_{i-1}$ represents the previous rear wheel steering angle. A subsequent step 109 is executed to receive the digitized signal of the output signal of the yaw rate sensor $1c$ and then the received signal is used in a step 110 to calculate a yaw rate $\dot{\theta} y$.

Figure 12:
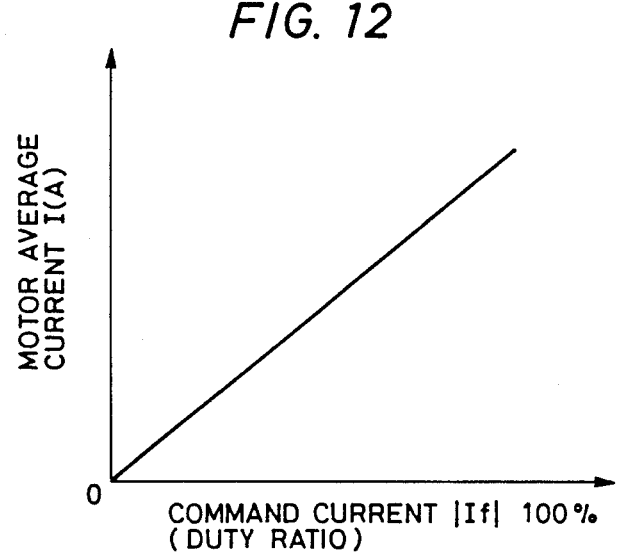
FIG. 12 is a graphic diagram showing the relation between the control value and the motor average current value.

FIG. 8C is a flow chart illustrating a second regular interval interruption routine (int—DUTY1) for supplying the drive circuit 180 with a current corresponding to the final current command value If calculated in the main routine which will be described hereinafter with reference to FIG. 9. In a step 111, the microcomputer 60 checks whether If≧0. If so, control goes to a step 112 in which a first terminal a (FIG. 11) of the drive circuit 180 is set to high level and a second terminal b (FIG. 11) thereof is set to low level so as to supply a third terminal c (FIG. 11) thereof with a pulse with a duty ratio which is determined on the basis of the relation between the current If and the motor current I as shown in FIG. 12. A step 113 first sets the terminal c to high level and then sets a timing for executing a duty interruption routine (int—DUTY 2) of FIG. 8D so that the terminal c is set to lower level as compared with the duty ratio. The duty interruption routine of 8D is executed so that a pulse with a desired duty is applied to the terminal c. The frequency of the duty pulses is determined in accordance with the frequency of occurrence of the second regular interval interruption, and the ON time is the interval between the occurrence of the second regular interval interruption and the occurrence of the duty interruption.

On the other hand, if the decision is NO in the step 111, steps 112' and 113' are executed. The step 112' sets the terminal a to high level and the terminal c to low level. The step 113' first sets the terminal b to high level and then sets a timing for executing the FIG. 8D duty interruption routine. In the FIG. 8D duty interruption routine, a step 115 is executed to check If≧0. Although the FIG. 8C interruption routine determines the rise time of the duty pulse, the FIG. 8D interuption routine determines the fall time of the duty pulse. In the FIG. 8D interruption routine, first a step 115 is executed to check whether If set in step 114 of the FIG. 8C interruption routine is equal to or greater than zero. If so, a step 116 is executed so that the terminal c is set to the low level. On the other hand, if not, a step 116' is executed so that the terminal b is set to the low level.

Figure 9:
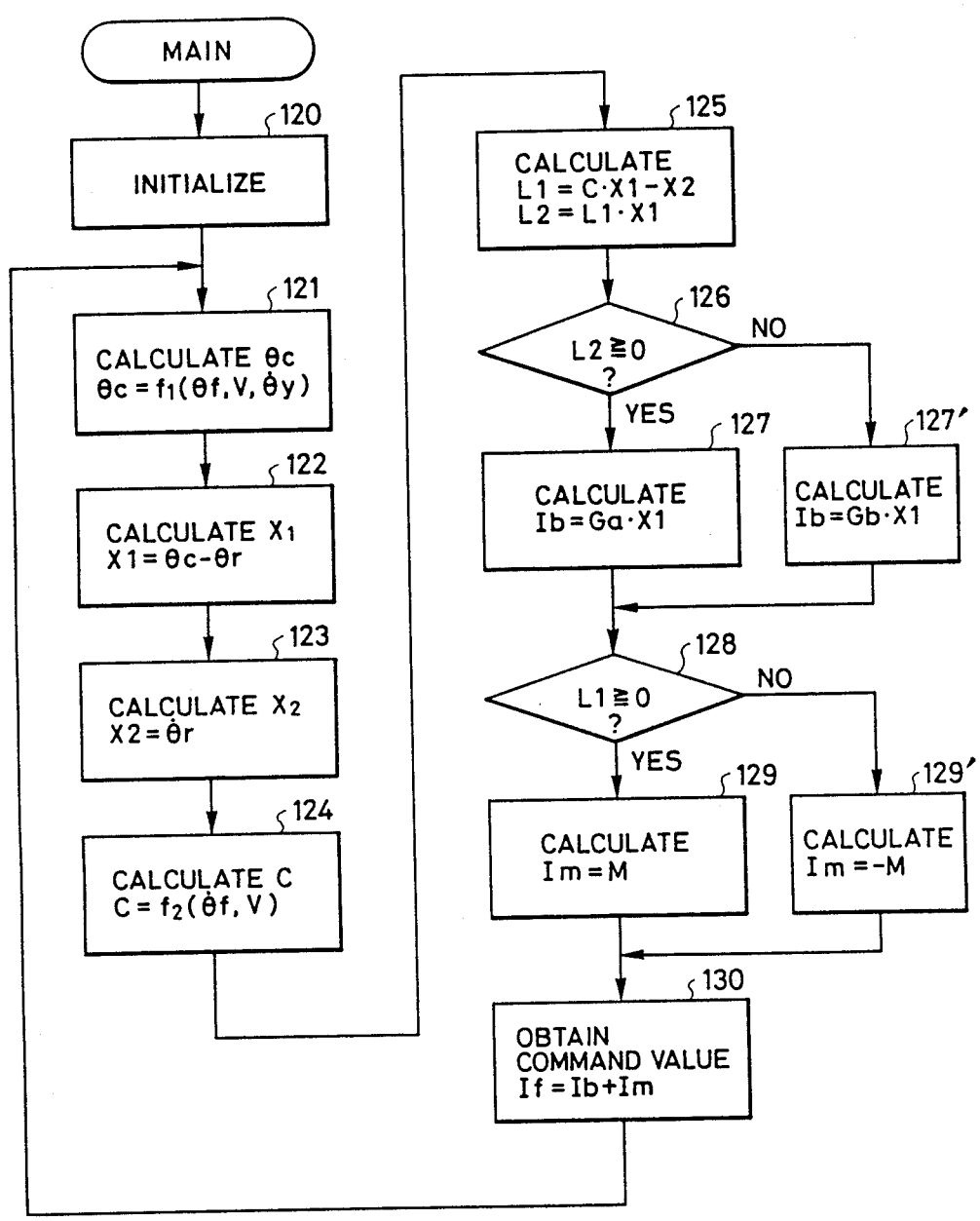
Figure 10:
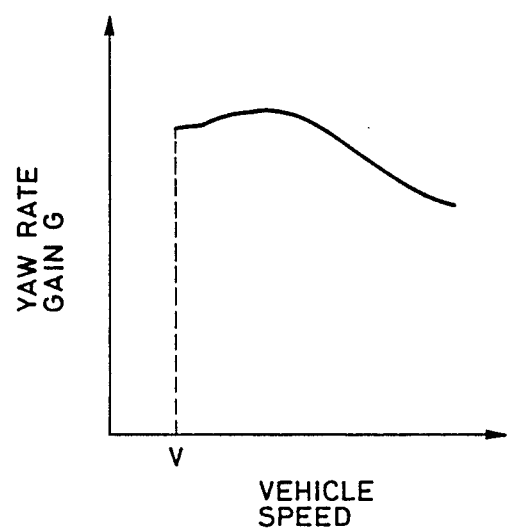
FIG. 10 is a graphic diagram showing the relation between the yaw rate gain and the vehicle speed.

FIG. 9 is a flow chart illustrating the main routine. The program execution starts at a step 120 for initialization of memories and so on, followed by a step 121 to calculate the target steering angle $\theta c$ of the rear wheels in accordance with the equation $\theta c = f1(\theta f, V, \theta y)$ where f1 is a constant which is determined on the basis of the present front wheel steering angle $\theta f$. Here, when the vehicle speed V is over Vo, the target rear wheel steering angle $\theta c$ is corrected by adding a correction term so that the relation between the yaw rate gain G and the vehicle speed V can be satisfied as shown in FIG. 10. The correction term is determined in accordance with the difference between the actual yaw rate gain G' (=actual yaw rate $\theta y$/actual front wheel steering angle $\theta f$) and the yaw rate gain G (yaw rate/front wheel steering angle).

Thereafter, a step 122 is executed to calculate the difference X1 between the target rear wheel steering angle $\theta c$ and the actual rear wheel steering angle $\theta r$. In a subsequent step 123, the rear wheel steering angular velocity $\dot{\theta} r$ which is obtained in the first regular interval interruption routine is set as X2. In a step 124, the coefficient C, as described above, is calculated on the basis of the front wheel steering angular velocity $\dot{\theta} f$ and the vehicle speed V. For example, the coefficient C may be obtained in accordance with a two-dimensional map prestored in a memory. A step 125 is then executed to calculate switching functions L1 and L2 using X1, X2, C obtained in the previous steps. Control goes to a step 126 for checking whether L2≧0. If L2 is positive, a step 127 is executed where the current basic term Ib is calculated in accordance with the equation Ib=Ga·X1. On the other hand, if L2 is negative, a step 127' is executed where Ib is calculated as Ib=Gb·X1. A step 128 is then executed to check whether L1≧0. If L1 is positive, the current correction term Im is set to M in a step 129. If L1 is negative, Im is set to —M in a step 129'. In a step 130, the final current command value If is calculated in accordance with the equation If=Ib+Im. Thereafter, the operational flow returns to the step 121 so that the final current command value If is repeatedly determined.

The drive circuit 180 for driving the servo motor 5 will hereinbelow described with reference to FIG. 11.

Figure 4:
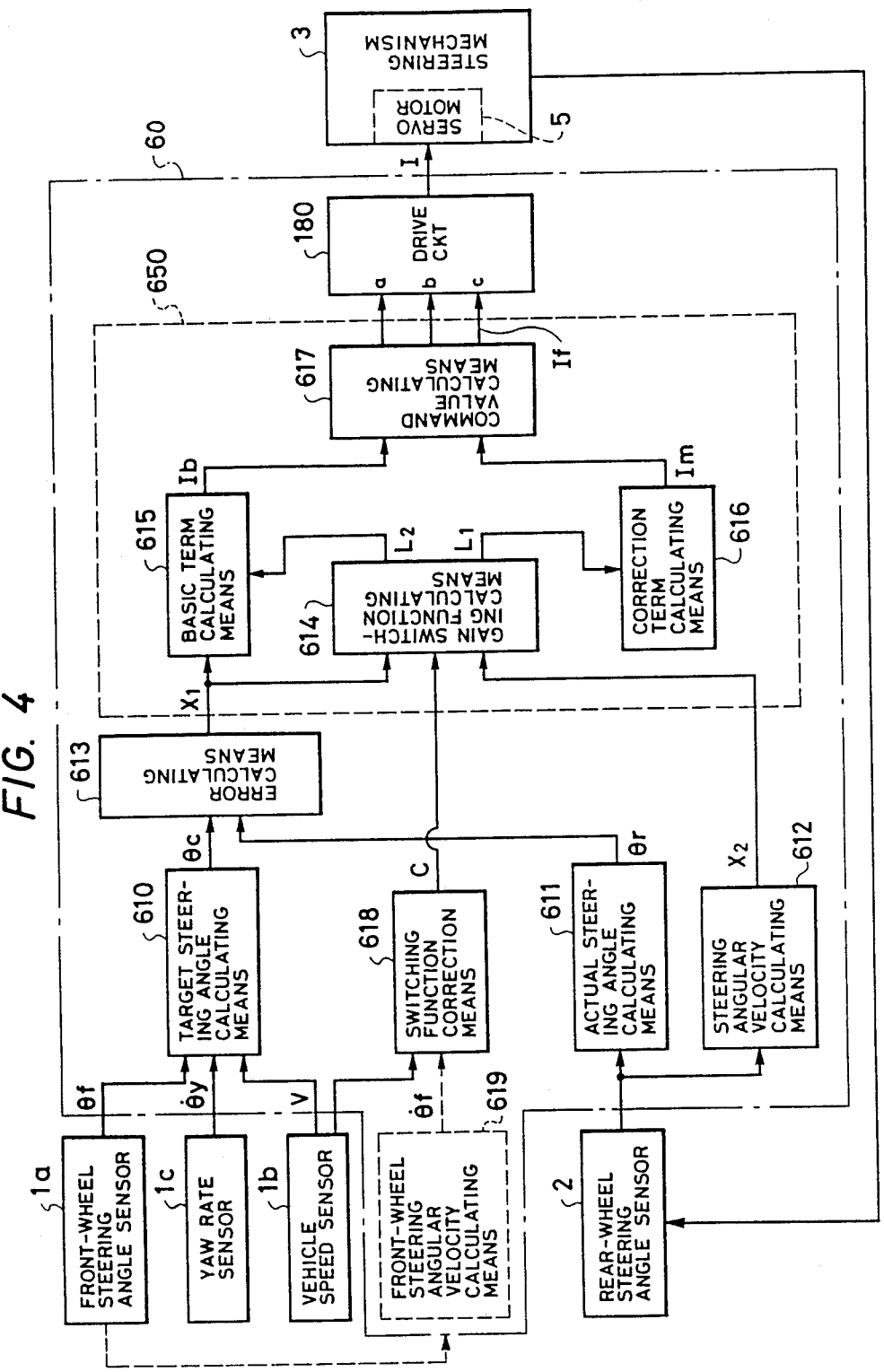
FIG. 4 is a functional block diagram illustrating the first embodiment of the present invention.

When If supplied from the final command value calculation means 617 of FIG. 4 is over zero, that is, when the servo motor 5 is positively rotated, the first terminal a of the drive circuit 180 is set to high level, the second terminal b thereof is set to low level, and an ON-OFF pulse with a duty ratio corresponding to the absolute value If of the command value If, i.e., command signal, is supplied to the third terminal c thereof. On the other hand, when If<0, that is, when the servo motor 5 is rotated in the reverse direction, the first and third terminals a and c are respectively set to low level and the command signal is supplied to the second terminal b.

Operation of the drive circuit 180 is as follows.

Since, when If>0, the first terminal a is at a high level, the output of an inverter 181 is at a low level and therefore transistors 182 and 183 are respectively turned off. On the other hand, transistors 184 and 185 are respectively in the ON-condition. In this case, since the second terminal b is at a low level, transistors 186 and 187 are respectively in the OFF-condition, turning off a transistor 188. Therefore, the battery voltage $V_B$ is applied through the transistor 185 to an output terminal m. In this state, if a duty ratio pulse is applied to the third terminal c, transistors 189, 190, 191 are ON-OFF-controlled in response to ON (high level) and OFF (low level) of the duty ratio pulse. When the transistor 191 is in the ON-condition, a positive current flows through the output terminal m, an output terminal n and the transistor 191. Similarly, when the transistor 191 is switched from ON to OFF, current remaining in the coil of the motor 5 flows, as positive current, in the loop comprising a diode 192, the transistor 185, the output terminal m, the motor 5 and the output terminal n for a time period determined by the inductance of the motor coil. As a result, the average current I actually flowing through the motor 5 is proportional to the duty ratio (ON duty ratio) of the duty ratio pulse applied to the third terminal c. Furthermore, when If<0, the transistors are turned from ON to OFF or from OFF to ON and therefore the battery voltage $V_B$ is applied to the output terminal n. The transistor 188 is finally ON-OFF-controlled in accordance with ON-OFF of the duty ratio pulse applied to the second terminal b so that a negative current proportional to the duty ratio (ON duty ratio) flows through the motor 5. The residual current in the motor coil flows through a diode 193 and transistor 183 when the transistor 188 is in the OFF condition. It will be understood from the above description that the average current I corresponding to the current command value If as shown in FIG. 12 can be supplied to the servo motor 5.

Figure 13:
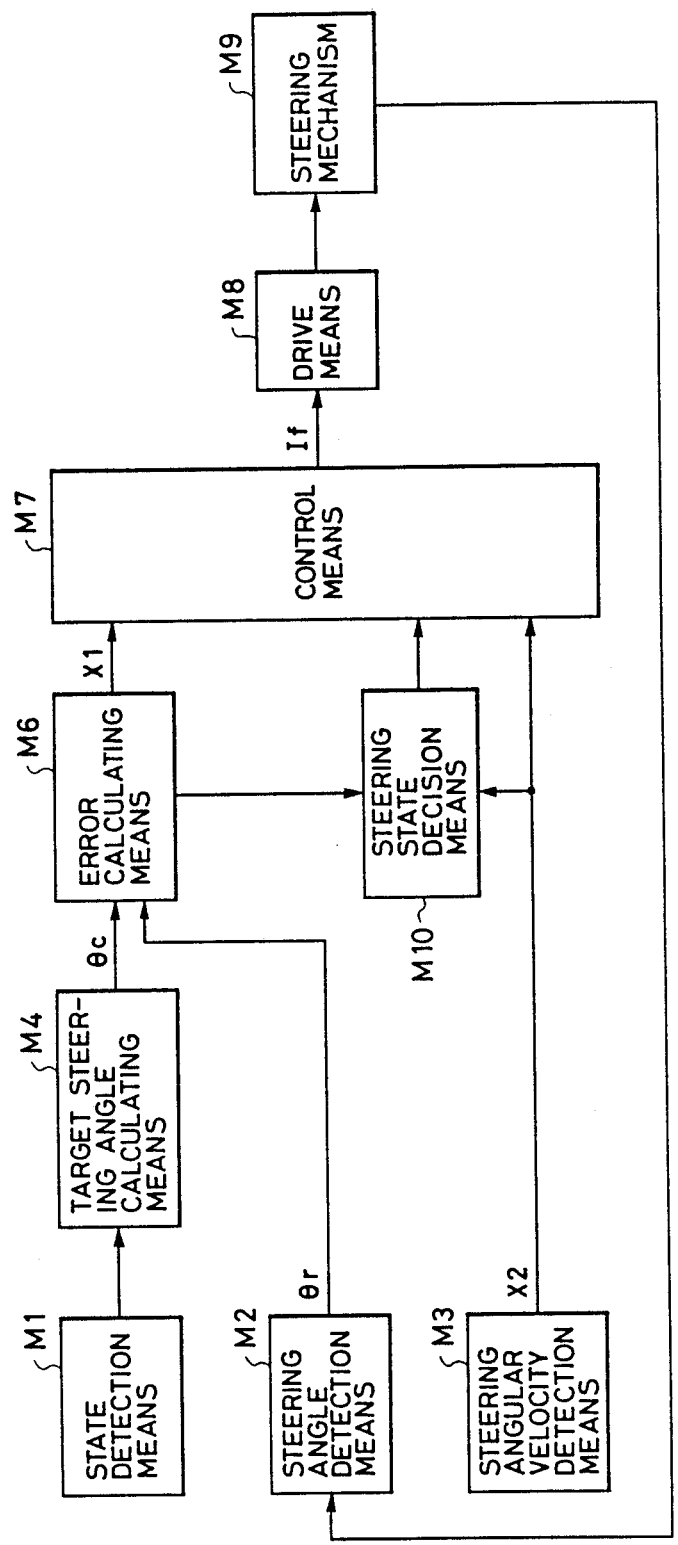
FIG. 13 is a block diagram showing the basic arrangement of a steering apparatus according to a second embodiment of the present invnetion.

FIG. 13 is a block diagram showing the basic arrangement of a steering apparatus according to a second embodiment of the present invention. Prior to making a detailed description of the steering apparatus according to this embodiment, a brief description will be made with reference to FIG. 13 for a better understanding wherein parts corresponding to those in FIG. 1 are marked with the same numerals. In FIG. 13, a target steering angle calculating means M4 is responsive to the output signal of a vehicle state detection means M1 for detecting the travelling state of a motor vehicle so as to calculate a target steering angle of the motor vehicle. The output signal ($\theta c$) of the target steering angle calculating means M4 indicative of the calculated target steering angle is compared in an error calculating means M6 with an actual steering angle signal ($\theta r$) generated from a steering angle detection means M2 so as to calculate the difference between the calculated target steering angle and the detected actual steering angle. The error calculating means M6 generates an error signal (X1) indicative of the calculated difference which is in turn supplied to a control means M7 which is also connected to a steering angular velocity detecting means M3 for receiving a steering angular velocity signal (X2) generated therefrom. In the control means M7, a switching function is obtained on the basis of the difference and the detected steering angular velocity and a switching line is formed in accordance with the obtained switching function. Also included therein is steering state decision means (M10) for checking whether the steering operation of a steering mechanism M9 is terminated on the basis of the difference (X1) and the steering angular velocity (X2) and for generating a signal on the termination of the steering operation. The control means M7 generates a control signal (If) through drive means M8 to a steering mechanism M9 so that the difference and the steering angular velocity are converged to zero under the restriction imposed by the swtiching line. The control means M7 controls the speed of the convergence in response to the steering termination signal from the steering state decision means M10.

Figure 14:
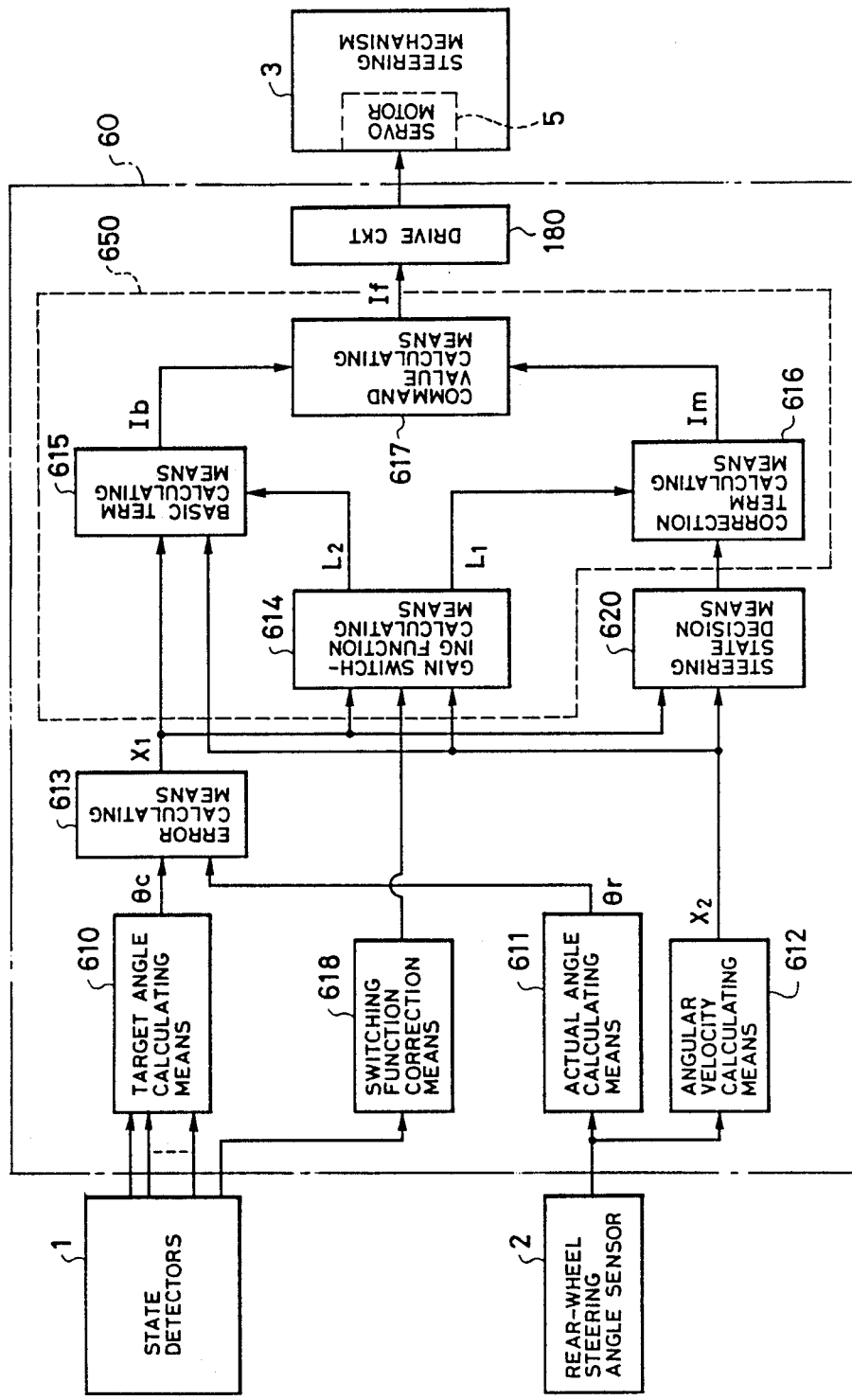
FIG. 14 is a functional diagram for describing the second embodiment of the invention.

A more detailed description of the steering apparatus according to the second embodiment of the present invention will hereinbelow be made with reference to FIG. 14 wherein parts in FIG. 14 corresponding to those in FIG. 4 are marked with the same reference numerals. Note here that FIGS. 2 and 3 illustrated for description of the foregoing embodiment can also be employed for this second embodiment. In FIG. 14, the microcomputer 60 basically comprises means 610 for computing the target steering angle $\theta c$ of the rear wheels 8 in accordance with state signals $\theta f$, V $\theta y$ from the front wheel steering angle sensor 1a, vehicle speed sensor 1b and yaw rate sensor 1c, means 611 for calculating the actual rear wheel steering angle $\theta r$ in response to a signal from the rear wheel steering angle sensor 2, means 612 for computing the steering angular velocity X2 on the basis of the rate of change of the signal from the rear wheel steering angle sensor 2, i.e., the differentiated value of the signal with respect to time, means 613 for calculating the difference X1 between the target steering angle $\theta c$ and the actual steering angle $\theta r$, means 618 for computing and correcting the coefficient C of switching functions (which will be described hereinafter) on the basis of the vehicle speed signal V and so on, and steering state decision means 620 for checking whether the steering mechanism has terminated the steering operation or is in operation on the basis of the difference X1 and the steering angular velocity X2 and for generating a signal in response to the termination of the steering operation. The microcomputer 60 further comprises control means 650 for obtaining the switching functions L1, L2 which satisfy the conditions that the difference X1 and the steering angular velocity X2 are respectively converged to zero, for causing the speed of the convergence to be decreased in response to the steering termination signal from the steering state decision means 620 and for outputting a command signal If to the drive circuit 180 so that the difference X1 and the steering angular velocity X2 are respectively converged to zero by being constrained by a switching line Z obtained on the basis of the switching functions L1 and L2.

In the target steering angle computing means 610, the target steering angle $\theta c$ is first calculated on the basis of the vehicle speed V and the front wheel steering angle $\theta f$ so that the ratio of the rear wheel target steering angle $\theta c$ to the front wheel steering angle $\theta f$ (target steering ratio: $\theta c/\theta f$) assumes a predetermined value and, when the vehicle speed is over a predetermined value Vo, it is corrected so that a desired yaw rate gain (the ratio of the yaw rate value $\theta y$ to the front wheel steering angle $\theta f$) can be derived from the yaw rate value $\theta y$ from the yaw rate sensor 1c. The actual steering angle calculating means 611 calculates the actual steering angle $\theta r$ on the basis of the position of the power piston 3a in accordance with a data map wherein the relation between the positions of the power piston 3a and the rear wheel steering angles is predetermined or in accordance with an equation. The switching funtion correcting means 618 obtains the coefficient C (positive constant) on the basis of the vehicle speed V as described above with reference to FIGS. 6A and 6B.

The steering state decision means 620 generates the steering termination signal under the conditions that the difference X1 is $-e \leq X1 \leq e$ and the steering angular velocity X2 is $-v \leq X2 \leq v$ where e and v are positive constants respectively, that is, when the steering angle of the rear wheel becomes substantially equal to the target steering angle and the steering angular velocity X2 assumes a small value, it is decided that the steering mechanism is in operation when the above-mentioned conditions are not satisfied. Here, it is also appropriate that it is arranged such that the steering state decision means 620 decides the termination of the steering operation when either of the conditions is satisfied.

The control means 650 comprises gain switching function calculation means 614, basic term calculation means 615, correction term calculation means 616, and final command value calculation means 617. The gain switching function calculation means 614 calculates gain switching functions L1 and L2 on the basis of the difference X1 between the target steering angle $\theta c$ and the actual steering angle $\theta r$, the steering angular velocity X2 and the coefficient C in accordance with the following equations (8) and (9), which correspond to the above-mentioned equations (1) and (2).

$$L1 = C \cdot X1 - X2 \qquad (8)$$

$$L2 = L1 \cdot X1 \qquad (9)$$

where C is the coefficient calculated by the switching function correcting means 618 as described above.

The basic term calculation means 615 calculates a basic term Ib in accordance with the following equation (10) when the gain switching function L2 is positive and in accordance with the following equation (11) when the gain switching function L2 is negative, the equations (10) and (11) corresponding to the above-mentioned equations (3) and (4).

$$\text{when } L2 \geq 0, \; Ib = Ga \cdot X1 \qquad (10)$$

$$\text{when } L2 < 0, \; Ib = Gb \cdot X1 \qquad (11)$$

where Ga and Gb are constants which are used for keeping the stability of the rear wheels and are set to $Ga > 0$ and $Gb < 0$.

The correction term calculation means 616 calculates a correction term Im in accordance with the following equation (12) when the gain switching function L1 is positive and in accordance with the following equation (13) when the gain switching function L1 is negative, the equations (12) and (13) corresponding to the above-mentioned equations (5) and (6).

$$\text{when } L1 \geq 0, \; Im = M \qquad (12)$$

$$\text{when } L1 < 0, \; Im = -M \qquad (13)$$

where M is a variable and is between a constant Ma and a constant Mb, i.e., $Ma \geq M \geq Mb \geq 0$. M is determined in accordance with the steering state. When the steering mechanism is in operation, M is set to the constant Ma. On the other hand, when it is in the terminated state, M is set to the constant Mb so as to decrease the speed of the convergence. Here, Ma is set to a value greater than the disturbance value estimated to be applied to the rear wheel steering control system including the rear wheel steering mechanism and the servo mechanism. The estimated disturbance value corresponds to the value of current to be inputted to the servo motor 5 for the disturbance control, with the disturbance being converted into the rotation of the motor shaft of the servo motor 5.

The final command value calculation means 617 calculates a final command value If on the basis of the calculated basic term Ib and correction term Im in accordance with the following equation (14) which corresponds to the above-mentioned equation (7).

$$If = Ib + Im \qquad (14)$$

The command value If is outputted to the drive circuit 180 as a current command value, i.e., a duty ratio.

Figure 15A:
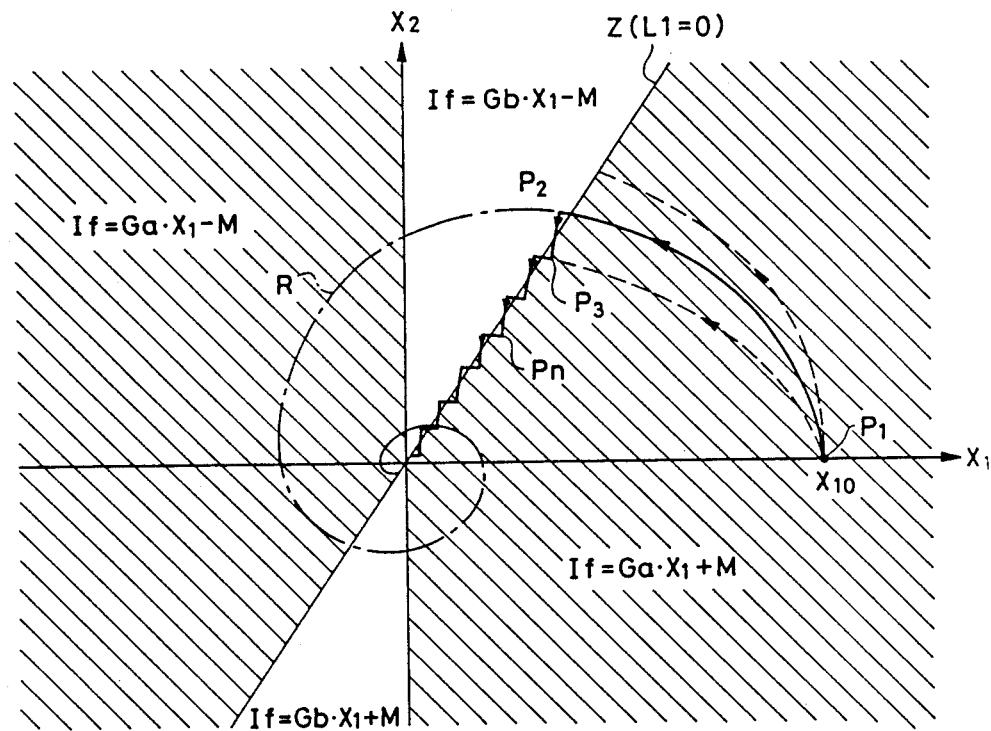
Figs. 15A and 15B are graphic illustrations useful for describing the second embodiment of the invention.
Figure 15B:
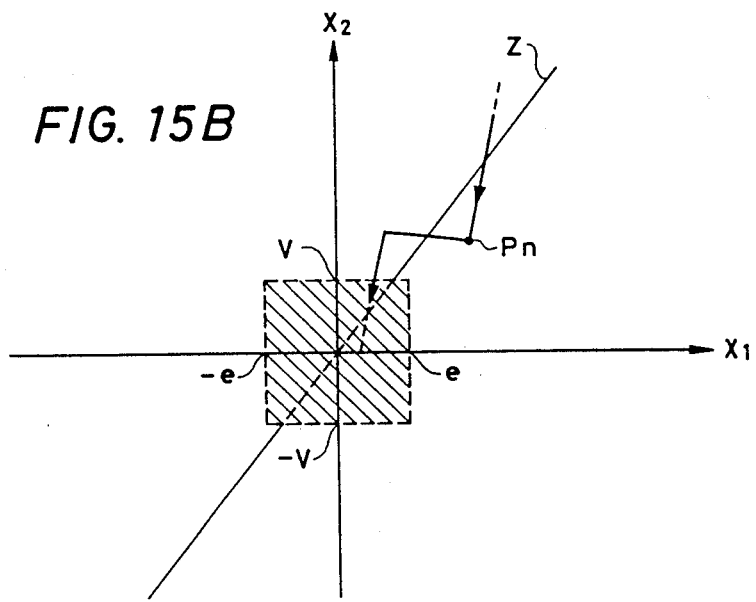

The entire operations executed in the control means 650 will be described with reference to FIGS. 15A and 15B. FIG. 15A shows a phase surface orbit. In FIG. 15A, the X-axis represents the difference X1 between the target steering angle and the actual steering angle, the Y-axis represents steering angular velocity X2 and the origin 0 represents the target steering angle $\theta c$, i.e., the state that the difference X1 is zero and the steering angular velocity X2 is also zero. A solid line Z represents a switching line which can be obtained under the condition that the gain switching function L1=0. FIG. 15B is an enlarged illustration of the portion in the vicinity of the origin 0. In FIG. 15A, portions in which oblique lines are drawn represents the regions of $L2 = L1 \cdot X1 \geq 0$. When the vehicle steering state determined on the basis of the difference X1 and the steering angular velocity X2 is in the oblique line region, the basic term calculation means 615 calculates the basic term Ib as $Ib = Ga \cdot X1$. Otherwise, the basic term calculation means 615 calculates the basic term Ib as $Ib = Gb \cdot X1$. Furthermore, when the state is in the regions of $L1 = C \cdot X1 - X2 \geq 0$, that is, when it is in the regions below the switching line Z, the correction term calculation means 616 sets the correction term Im to M, i.e., $Im = M$. On the other hand, when the state is in the regions above the switching line Z, the correction term calculation means 616 sets it to $-M$, i.e., $Im = -M$.

Here, for example, when the difference X1 between the actual steering angle $\theta r$ and the target steering angle $\theta c$ assumes X10, i.e., point P1 (X10, 0), in response to variations of the command value and the target steering angle $\theta c$, the drive circuit 180 supplies a positive current to the servo motor 5 in accordance with the final command value If ($= Ga \cdot X1 + M$) (If > 0), thereby controlling the steering mechanism. In response to the supply of the positive current, the difference X1 is decreased with the steering angular velocity X2 of the rear wheels being rapidly increased (accelerated) from zero. Thereafter, when the state reaches a point P2 where the steering angular velocity X2 exceeds the switching line Z, the basic term Ib is given as $Ib = Gb \cdot X1$ and the correction term Im is given as $Im = -M$, so as to supply a reverse current (If < 0) corresponding to a new command value If ($= Gb \cdot X1 - M$) whereby the state is directed to a point P3. When the state has reached the point P3 after going across the switching line Z, a positive current obtained on the basis of If=Ga·X1+M is again supplied to the servo motor 5 so that the state reaches a point P4. Thus, the state is controlled to be converged to the origin (0, 0), i.e., the target steering angle $\theta c$, without overshoot by being restricted by the switching line Z. Even if the state is slipped out of the point P1 or P2 as indicated by dotted lines due to parameter variations, the state is converged to the target steering angle $\theta c$ without overshoot by being restricted by the switching line Z.

For reaching and constraining the switching line Z, the variable M is required to be set to a predetermined value (current). The predetermined value is the constant Ma which is required to be set to a value greater than the current value corresponding to the maximum value of disturbance such as variations of the power supply voltage and variations of the load torque applied to the motor on the steering operation. The current value represents the current value to be inputted to the motor when the maximum disturbance is converted in terms of the motor shaft. This will be understood from the fact that the generation torque of the motor is proportional to the motor current, and when the steering state assumes the point P1 (difference X10), for performing the control with high responsibility, the motor is required to generate a great torque to twist the torsion bar at the maximum speed. However, in the case that the state point Pn has reached the vicinity of the origin 0 (target steering angle) under the restriction of the switching line Z, the motor speed is decreased and the load torque applied to the motor is decreased because it is not necessary to further twist the torsion bar. At this time, if the greater current determined by the constant Ma as well as in the steering operation is supplied thereto, an excessive torque is generated in the motor irrespective of light load being required, resulting in generation of hunting (periodic variations in the vicinity of the target steering angle). Therefore, for elimination of this problem, in this embodiment, when the state point Pn reaches the vicinity of the origin 0, that is, satisfying the conditions that of $-e \leq X1 \leq e$ and $-v \leq X2 \leq v$, the steering state decision means 620 decides the termination of the steering operation and correction term calculating means 616 switches the value of M from Ma to Mb whereby the current to the motor is decreased to decrease the speed of convergence to the origin 0. Thus, in the steering termination state, the state point Pn is released from the restriction of the switching line Z, and the steering angular velocity X2 is gradually decreased, and the difference X1 becomes in the range of $-e$ and $e$, resulting in prevention of the hunting. When the steering state is in the portions other than the oblique portion in FIG. 15B, the steering state decision means 620 decides that the steering mechanism is in operation and the variable M is set to Ma. The constants e and v are determined in accordance with the control accuracy.

For switching the variable M in the correction term calculating means 616, when the state is varied from the operation to the termination, the variable M is changed from Ma to Mb by subtracting a predetermined value m1 from Ma at every time period $\Delta t1$. On the other hand, when the state is varied from the termination to the operation, the variable M is changed from Mb to Ma by adding a predetermined value m2 to Mb at every time period $\Delta t2$. This allows the switching of the variable M to be smoothly effected, resulting in smooth control. m1, m2, $\Delta t1$ and $\Delta t2$ may be determined in accordance with the characteristics of the motor to be used and so on.

In FIG. 15A, the dotted line R represent the state in which overshoot has occurred. If the above-mentioned control is not performed at the point P2, the difference X1 successively becomes zero, negative, zero and positive and is then converged to the origin 0. That is, the overshoot occurs by exceeding the target steering angle $\theta c$ and then occurs in the opposite direction. When the correction of the coefficient C of the gain switching function L1 is made, the switching line Z is varied as shown in FIG. 7B.

Figure 16:
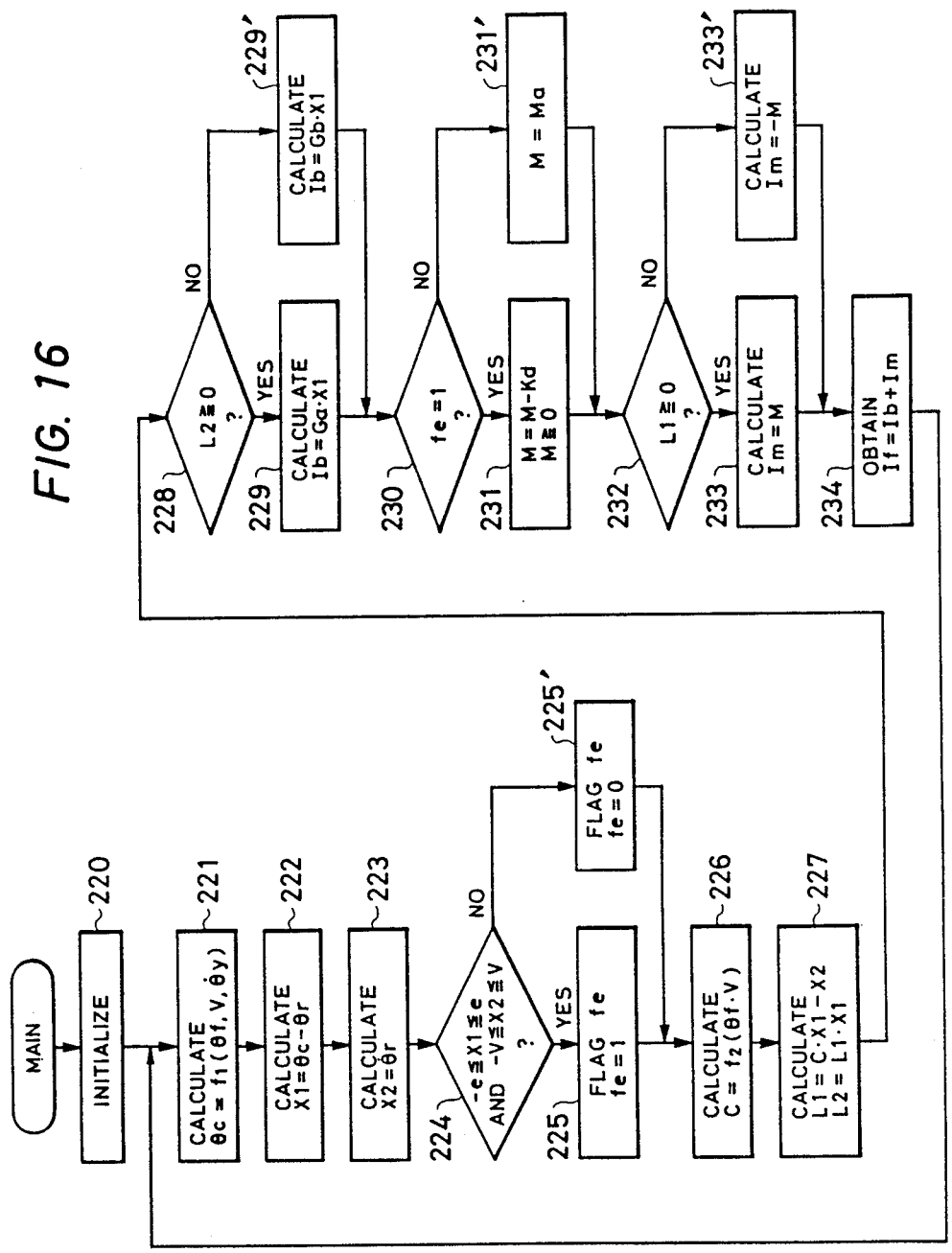
FIG. 16 is a flow chart showing the program provided for the second embodiment of this invention.

The above-mentioned steering system according to the second embodiment will be further described with reference to a flow chart of FIG. 16. The operations of the microcomputer in the second embodiment are substantially similar to the operations thereof in the first embodiment with the exception of the operations in connection with the steering state decision means 620. Therefore, only a main routine of FIG. 16 is illustrated for description of the second embodiment, and the description of the same routines are omitted for brevity.

The program execution starts at a step 220 for initialization of memories and so on, followed by a step 221 to calculate the target steering angle $\theta c$ of the rear wheels in accordance with the equation $\theta c = f1(\theta f, V, \theta y)$ where f1 is a constant which is determined on the basis of the present front wheel steering angle $\theta f$. Here, when the vehicle speed V is over Vo, The target rear wheel steering angle $\theta c$ is corrected by adding a correction term so that the relation between the yaw rate gain G and the vehicle speed V can be satisfied as shown in FIG. 10. The correction term is determined in accordance with the difference between the actual yaw rate gain G' (=actual yaw rate $\theta y$/actual front wheel steering angle $\theta f$) and the yaw rate gain G (yaw rate/front wheel steering angle).

Thereafter, a step 222 is executed to calculate the difference X1 between the target rear wheel steering angle $\theta c$ and the actual rear wheel steering angle $\theta r$. In a subsequent step 223, the rear wheel steering angular velocity $\dot{\theta}r$ which is obtained in the first regular interval interruption routine is set as X2. A subsequent step 224 is provided for checking whether the conditions of $-e \leq X1 \leq e$ and $-v \leq X2 \leq v$ are satisfied. If satisfied, a decision flag fe is set to "1" in a step 225, "1" representing that the steering operation is terminated. On the other hand, if not satisfied, the decision flag fe is set to "0" in a step 225', "0" representing that the steering is in operation. In a step 226, the coefficient C, as described above, is calculated on the basis of the front wheel steering angular velocity $\dot{\theta}f$ and the vehicle speed V. For example, the coefficient C may be obtained in accordance with a two-dimensional map prestored in a memory. A step 227 is then executed to calculate switching functions L1 and L2 using X1, X2, C obtained in the previous steps. Control goes to a step 228 for checking whether $L2 \geq 0$. If L2 is positive, a step 229 is executed where the current basic term Ib is calculated in accordance with the equation Ib=Ga·X1. On the other hand, if L2 is negative, a step 229' is executed where Ib is calculated as Ib=Gb·X1. A decision step 230 is then executed for checking whether the flag fe="1". If "YES", at step 231 the variable M is decreased by Kd at predetermined time intervals (for example, 5 ms) until it becomes a predetermined value. M is set to $M \geq o$ and does not becomes negative. On the other hand, If "NO", at step 231' M is immediately set to Ma. Control advances to a step 232 to check whether L1≧0. If so, the current correction term Im is set to M in a step 233. If L1 is negative, Im is set to −M in a step 233'. In a step 234, the final current command value If is calculated in accordance with the equation If=Ib+Im. Thereafter, the operational flow returns to the step 221 so that the final current command value If is repeatedly determined. The calculated If is supplied to the drive circuit 180 as shown in FIG. 11 so that the servo motor 5 is controlled in accordance with the supplied If. Although in the above description Kd is a constant value, it is also appropriate that Kd can be varied in accordance with the magnitude of M.

According to the present invention, since the coefficient C is corrected on the basis of the vehicle speed V or the vehicle speed V and the front wheel steering angular velocity θf, the response speed of the control can be appropriately changed. Thus, the response is set to be low in the low vehicle speed region, is set to be high in the middle vehicle speed and is set to low in the high vehicle speed region for safe driving, resulting in improving the steering feeling for the vehicle driver.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiments the rear wheels are steering-controlled, the present invention can be employed for the front wheels only. Furthermore, although in the above the steering angular velocity X2 is calculated on the basis of the signal from the rear wheel steering angle sensor, it is also appropriate that it is obtained on the basis of the rotational speed of the pinion gear 3b of the rack and pinion mechanism 3.

What is claimed is:

1. A steering apparatus for use in a motor vehicle, comprising:
   steering mechanism means for regulating a steering angle of a wheel of said motor vehicle in accordance with an input signal thereto;
   first detection means for detecting a travelling state of said motor vehicle and generating a signal indicative of the detected vehicle travelling state;
   second detection means for detecting an actual steering angle made by said steering mechanism means and for generating a signal indicative of the detected actual steering angle;
   target steering angle setting means responsive to the vehicle travelling state signal for determining a target steering angle on the basis of the detected vehicle travelling state and for generating a signal indicative of the determined target steering angle;
   error calculating means responsive to the actual steering angle signal and the target steering angle signal for obtaining the difference (X1) between the determined target steering angle and the detected actual steering angle and for generating a signal indicative of the obtained difference (X1);
   angular velocity calculating means for calculating a steering angular velocity (X2) on the basis of the actual steering angle signal from said second detection means and for generating a signal indicative of the calculated steering angular velocity (X2);
   control means responsive to said difference indicating signal from said error calculating means and said steering angular velocity indicating signal from said angular velocity calculating means for outputting a control signal representing a command value (If), said control means including:
      first calculating means for calculating the relative relationship on a coordinate axis between the obtained difference (X1) and the calculated steering angular velocity (X2), the relative relationship being expressed by a line which passes through the origin of said coordinate axis to allow both the obtained difference (X1) and calculated steering angular velocity (X2) to assume zero; and
      second calculating means for calculating said command value (If) so that both the obtained difference (XI) and calculated steering angular velocity (X2) are respectively converged to zero in accordance with said line representing the relative relationship therebetween; and
   drive circuit means responsive to said control signal from said control means for outputting a drive current as said input signal to said steering mechanism means so as to regulate the steering angle of said motor vehicle wheel.

2. A steering apparatus as claimed in claim 1, further comprising correction means for correcting the inclination of said line designating the responsibility of the control on the basis of the vehicle travelling state detected by said first detection means.

3. A steering apparatus as claimed in claim 2, wherein said first detection means detects a speed of said motor vehicle and said correction means corrects the inclination of said line in accordance with the vehicle speed detected by said first detection means.

4. A steering apparatus as claimed in claim 3, wherein said first calculating means of said control means calculates two switching functions (L1) and (L2) expressing the relative relationship between the obtained difference (X1) and the calculated steering angular velocity (X2) in accordance with the following equations:

$$L1 = C \cdot X1 - X2$$

$$L2 = L1 \cdot X1$$

where C is a coefficient and is greater than zero, and said correction means corrects said switching functions (L1) and (L2) for the correction of the line inclination by changing the value of said coefficient C.

5. A steering apparatus as claimed in claim 2, wherein said steering mechanism means is arranged to regulate the steering angle of the rear wheel of said motor vehicle, and said first detection means detects a speed of said motor vehicle and a steering angular velocity of a front wheel of said motor vehicle, and said correction means corrects the inclination of said line on the basis of the detected vehicle speed and the detected front wheel steering angular velocity.

6. A steering apparatus as claimed in claim 5, wherein said second calculating means of said control means determines said command value (If) in accordance with the steps of:
   calculating a basic term (Ib) on the basis of the difference (X1) and said switching function (L2) in accordance with the following equations:

$Ib = Ga \cdot X1$ when $L2 \geq 0$ $Ib = Ga \cdot X1$ when $L2 \geq 0$ where Ga and Gb are constants;

calculating a correction term (Im) on the basis of the switching function (L1) in accordance with the following equations:

$Im = M$ when $L1 \geq 0$ $Im = -M$ when $L1 < 0$ where M is a constant which is equal to or greater than zero;

calculating said command value (If) on the basis of the calculated basic term (Ib) and correction term (Im) in accordance with the following equation:

$If = Ib + Im;$ and determining said control signal corresponding to the calculated command value (If).

7. A steering apparatus for use in a motor vehicle, comprising:

steering mechanism means for regulating a steering angle of a wheel of said motor vehicle in accordance with an input signal thereto;

first detection means for detecting a travelling state of said motor vehicle and generating a signal indicative of the detected vehicle travelling state;

second detection means for detecting an actual steering angle made by said steering mechanism means and for generating a signal indicative of the detected actual steering angle;

target steering angle setting means responsive to the vehicle travelling state signal for determining a target steering angle on the basis of the detected vehicle travelling state and for generating a signal indicative of the determined target steering angle;

error calculating means responsive to the actual steering angle signal and the target steering angle signal for obtaining the difference (X1) between the determined target steering angle and the detected actual steering angle and for generating a signal indicative of the obtained difference (X1);

angular velocity calculating means for calculating a steering angular velocity (X2) on the basis of the actual steering angle signal from said second detection means and for generating a signal indicative of the calculated steering angular velocity (X2);

decision means for checking whether said steering mechanism means is in the state that the steering operation is terminated and for generating a signal indicative of the steering termination when the steering operation is terminated;

control means responsive to said difference indicating signal from said error calculating means and said steering angular velocity indicating signal from said angular velocity calculating means for outputting a control signal representing a command value (If), said control means including:

first calculating means for calculating the relative relationship on a coordinate axis between the obtained difference (X1) and the calculated steering angular velocity (X2), the relative relationship being expressed by a line which passes through the origin of said coordinate axis to allow both the obtained difference (X1) and calculated steering angular velocity (X2) to assume zero; and second calculating means for calculating said command value (If) so that both the obtained difference (X1) and calculated steering angular velocity (X2) are respectively converged to zero in accordance with said line representing the relative relationship therebetween, said second calculating means correcting said command value (If) in response to the generation of said steering termination signal from said decision means in a direction so as to decrease a steering control amount of said wheel; and drive circuit means responsive to said control signal from said control means for outputting a drive current as said input signal to said steering mechanism means so as to regulate the steering angle of said motor vehicle wheel.

8. A steering apparatus as claimed in claim 7, wherein said first calculating means of said control means calculates two switching functions (L1) and (L2) expressing the relative relationship between the obtained difference (X1) and the calculated steering angular velocity (X2) in accordance with the following equations:

$L1 = C \cdot X1 - X2$ $L2 = L1 \cdot X1$ where C is a coefficient and is greater than zero.

9. A steering apparatus as claimed in claim 8, further comprising correction means for correcting said switching functions (L1), (L2) on the basis of the vehicle travelling state detected by said first detection means, said correction means correcting said switching functions (L1), (L2) by changing the value of said coefficient C.

10. A steering apparatus as claimed in claim 8, wherein said second calculating means of said control means determines said command value (If) in accordance with the steps of:

calculating a basic term (Ib) on the basis of the difference (X1) and said switching function (L2) in accordance with the following equations:

$Ib = Ga \cdot X1$ when $L2 \geq 0$ $Ib = Gb \cdot X1$ when $L2 < 0$ where Ga and Gb are constants;

calculating a correction term (Im) on the basis of the switching function (L1) in accordance with the following equations:

$Im = M$ when $L1 \geq 0$ $Im = -M$ when $L1 < 0$ when M is a variable which is set to be equal to or greater than zero;

calculating said command value (If) on the basis of the calculated basic term (Ib) and correction term (Im) in accordance with the following equation:

$If = Ib + Im;$ and determining said control signal corresponding to the calculated command value (If).

11. A steering apparatus as claimed in claim 10, wherein said decision means decides the steering termination state under the conditions of $-e \leq X1 \leq e$ and $-v \leq X2 \leq v$, where e and v are constants which are respectively greater than zero.

12. A steering apparatus as claimed in claim 11, wherein said second calculating means of said control means decreasing said variable M to a first predetermined value Mb in response to the generation of said steering termination signal from said decision means.

13. A steering apparatus as claimed in claim 12, wherein said variable M is set to a second predetermined value Ma when said steering mechanism means is in operation and is gradually decreased to said first predetermined value Mb by subtracting a third predetermined value from said variable M at every predetermined time period in response to the generation of said steering termination signal, where $Ma > Mb \geq 0$.

14. A steering apparatus as claimed in claim 13, wherein said second calculating means of said control means changes the variable M to said second predetermined value Ma when the generation of said steering termination signal is stopped.

* * * * *